United States Patent

[11] 3,591,267

[72] Inventors Tokusaburo Kakiuchi;
 Hideaki Akiyama, both of Tokyo, Japan
[21] Appl. No. 841,797
[22] Filed July 15, 1969
[45] Patented July 6, 1971
[73] Assignee Kabushiki Kaisha Ricoh
 Tokyo, Japan
[32] Priority July 15, 1968
[33] Japan
[31] 43/49766

[54] SOUND HEAD POSITIONING DEVICE FOR SMALL-SIZED CINEPROJECTOR
4 Claims, 4 Drawing Figs.
[52] U.S. Cl. ................................................. 352/29,
 274/4 A, 352/72
[51] Int. Cl. .................................................... G03b 31/02

[50] Field of Search ......................................... 352/1, 29,
 72, 78; 274/4 A

[56] References Cited
UNITED STATES PATENTS
3,300,270 1/1967 Finnerty ...................... 352/29
3,176,310 3/1965 Finnerty ...................... 352/29

Primary Examiner—Louis R. Prince
Assistant Examiner—Joseph W. Roskos
Attorney—Burgess, Ryan and Hicks ABSTRACT: A sound head positioning device having a baseplate on which a sound head is mounted and being biased into a first position by a spring. A film cartridge is inserted to abut and rotate the baseplate to a second position from where the baseplate is slidable to move the sound head into contact with the film. Lateral and vertical adjustments for the sound head are provided.

PATENTED JUL 6 1971

3,591,267

INVENTORS
TOKUSABURO KAKIUCHI
HIDEAKI AKIYAMA
BY Burgess, Ryan + Hicks
ATTORNEYS

SOUND HEAD POSITIONING DEVICE FOR SMALL-SIZED CINEPROJECTOR

BACKGROUND OF THE INVENTION

The present invention relates to a sound head positioning device for small-sized cineprojectors and more particularly to a sound head positioning device of the type in which a sound head is moved into place to be operatively opposed with a sound track of the film in response to the insertion of a film cartridge.

In the conventional small-sized cineprojector of the type using cartridges, the sound heads are generally incorporated in the cartridges, which inevitably brings about a tremendous increase in cost. In case of so-called self-containing projector in which a projection screen is attached to a housing holding the projector, only one reflecting mirror is used to reflect the projection light in order to simplify its construction. Therefore, the film is loaded in a cartridge in such a manner that the coated surface of the film is facing the center of the cartridge so that it is impossible to reproduce the sound without the use of a moving sound head of the type described above unless the cartridge incorporates its own sound head therein. Even though the movable sound head of the character described is employed, the cost of a projector will be reduced when it employs a simple projection optical system.

In view of the above, one of the objects of the present invention is to provide a sound head positioning device best suited for use in the self-containing projector or TV-type projector of the type described above.

Another object of the present invention is to provide a movable sound head positioning device simple in construction and reliable in operation.

A further object of the present invention is to provide a movable sound head positioning device which will reduce the cost of a self-containing or TV-type projector.

SUMMARY OF THE INVENTION

In brief, a sound head positioning device according to the present invention comprises a guide shaft securely fixed the main body of a projector; a head baseplate having an elongated slot into which is loosely fitted said guide shaft or pin; a sound head attached to said head baseplate through head position fine adjustment means; a pressure plate secured to the baseplate for pressing the head against the film; a spring for imparting to said baseplate a tendency so as to normally advance one portion of the baseplate into the path of cartridge insertion; and a guide plate secured to the main body in parallel with said path of cartridge insertion for controlling an angle of rotation of the baseplate which is caused to rotate by the cartridge against the above described tendency.

Upon insertion of the cartridge into the projector, it abuts against said one portion of the head baseplate so that the baseplate is caused to rotate about the guide shaft against its above described tendency. The rotation of the baseplate is stopped when it abuts against the guide plate and thereafter the baseplate is slidably moved along the guide shaft of pin and plate in the direction parallel with the movement of the cartridge as it is inserted into the projector, thereby pressing the sound head against the film.

A head lateral position adjustment plate is attached to the pressure plate which in turn is secured to the head baseplate for pressing the sound head against the film or sound track thereof. The fine adjustment of the head lateral position adjustment plate relative to the pressure may be effected by means of vertical adjustment screws and springs interposed between the adjustment plate and the head baseplate.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
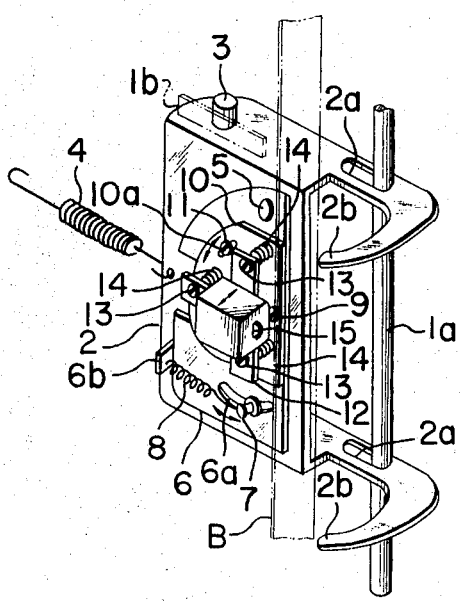
FIG. 1 is a perspective view of one embodiment of the present invention.

Referring to FIG. 1, a guide shaft 1a and a guide plate 1b are securely fixed to the main body 1 of a projector. The guide shaft 1a is loosely fitted into an elongated slot 2a formed through a sound head baseplate 2. A pin 3 extends upwardly from the baseplate 2 and a spring 4 is loaded between the head baseplate 2 and a stationary member. A pressure plate 6 is rotatably carried by a shaft 5 of the head plate 2 and a guide shaft 7 extending from the head baseplate 2 is loosely fitted into an elongated slot 6a formed in the pressure plate 6. A spring 8 is loaded between the guide shaft 7 and a projection 6b of the pressure plate 6. A head lateral or horizontal adjustment plate 10 is rotatably carried by a shaft 9 of the pressure plate 6 and is adapted to be held in position by means of a screw 11 which is screwed to the pressure plate 6 and is fitted into an elongated slot 10a formed through the adjustment plate 10. A sound head supporting plate 12 is securely fixed to the head adjustment plate 10 in spaced-apart relation therewith by means of springs 14 and adjustment screws 13 which adjust the vertical position of the sound head. The head supporting plate 12 has a sound head 15 securely fixed thereto. Within the main body 1 is disposed a sprocket wheel 16 around which is wrapped a film B loaded in a cartridge A so as to be driven intermittently.

Figure 2A:
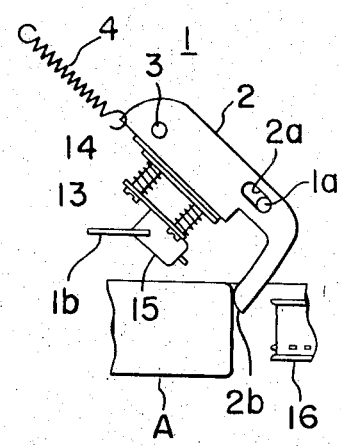
FIG. 2 is a side view illustrating the engagement of a cartridge with a sound head, FIG. 2A illustrating the initial engagement, FIG. 2B the intermediate engagement, and FIG. 2C, the final engagement.
Figure 2B:
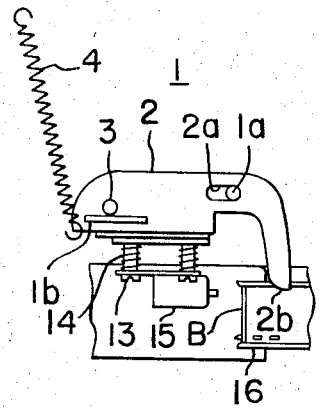
Figure 2C:
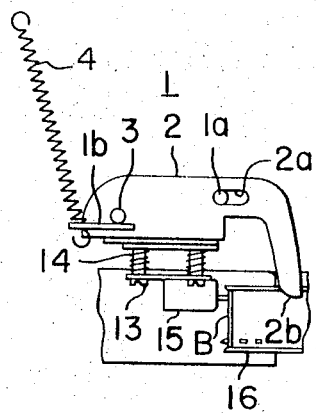

Upon insertion of the film cartridge A into the projector the outer casing of the cartridge A engages with a pawl 2b of the head baseplate 2 as shown in FIG. 2A so that the head baseplate 2 is caused to rotate in the counterclockwise direction against the spring 4. Thereafter, since the pin 3 engages with the guide plate 1b as shown in FIG. 2B, the rotation of the head baseplate 2 is prevented. When the cartridge A is inserted further, the exposed film B of the cartridge A is pressed against the sprocket wheel 16 and the head baseplate 2 is slidably moved with its slot 2a and pin 3 being guided by the guide shaft 1a and the guide plate 1b respectively in the direction parallel with the direction of insertion of the cartridge. Thereafter, the head 15 is pressed against the film B at a predetermined pressure by the spring 8 to a reproduction position as shown in FIG. 2C. When it is desired to remove the cartridge, the above described operations are reversed. That is, the head baseplate 2 is caused to slide in parallel with the cartridge A, rotate about the guide shaft 1a by the spring 4 in the clockwise direction and to be returned to the initial position shown in FIG. 2A.

In order that the sound head 15 may be correctly opposed to the sound track of the film in the position as shown in FIG. 2C, the lateral position of the head may be finely adjusted by loosening the screw 11, rotating the adjustment plate 10 about the shaft 9 and tightening the screw again so as to set the adjustment plate 10 in correct position. Thereafter, the vertical position of the sound head 15 may be adjusted by suitably adjusting the screws 13. Thus, the precise head position adjustment can be effected.

We claim:

1. A sound head positioning device for use with an insertable cartridge having film therein in a cineprojector, comprising:

a baseplate having a main flat portion and at least one end portion extending transversly thereto, said end portion having a slot formed therein;

a guide shaft fixedly mounted in the cineprojector and extending loosely through said slot;

a guide plate fixedly mounted in the cineprojector;

a pin formed on said end portion and adapted to abut said guide plate when said baseplate is rotated around said guide shaft;

a spring fixed at one end to the cineprojector and at the other end to said baseplate tending to exert a clockwise bias on said baseplate;

means mounting a sound head on said flat portion of said baseplate;

said baseplate rotatable counterclockwise against the bias of said spring to an intermediate position by inserting movement of the cartridge contacting said end portion, said pin abutting said guide plate at the intermediate position, and said guide shaft located in one end of said slot in the intermediate position; and said baseplate linearly slidable from the intermediate position to a final position by continued insertion of the cartridge contacting said end portion whereby said sound head contacts the film, said slot being slidable relative to said guide shaft so that said guide shaft is located in the other end of said slot in the final position.

2. A sound head positioning device according to claim 1, in which said sound head mounting means comprises a pressure plate pivotally mounted on said flat portion of said baseplate, biasing means hold said pressure plate in a predetermined position, and said mounting means further include lateral and vertical adjustment means.

3. A sound head positioning device according to claim 2, in which said mounting means includes an adjustment plate pivotally mounted on said pressure plate, and a tightenable screw and slot arrangement in said adjustment plate provides the lateral adjustment.

4. A sound head positioning device according to claim 3, in which said sound head is mounted on said adjustment plate by means of a supporting plate spaced from said adjustment plate by at least one spring and adjustment screw arrangement to provide the vertical adjustment.